(12) United States Patent
Jiang et al.

(10) Patent No.: US 12,531,600 B2
(45) Date of Patent: Jan. 20, 2026

(54) METHOD AND APPARATUS AND DEVICE FOR INDICATING RECONFIGURABLE INTELLIGENT SURFACE (RIS) WORKING MODE

(71) Applicant: VIVO MOBILE COMMUNICATION CO., LTD., Dongguan (CN)

(72) Inventors: Dajie Jiang, Dongguan (CN); Kun Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 344 days.

(21) Appl. No.: 18/139,935

(22) Filed: Apr. 26, 2023

(65) Prior Publication Data

US 2024/0080067 A1    Mar. 7, 2024

Related U.S. Application Data

(63) Continuation of application No. PCT/CN2021/129117, filed on Nov. 5, 2021.

(30) Foreign Application Priority Data

Nov. 6, 2020   (CN) .................. 202011233776.X

(51) Int. Cl.
*H04B 7/04*   (2017.01)
*H04B 1/401*   (2015.01)
*H04L 5/00*   (2006.01)

(52) U.S. Cl.
CPC ......... *H04B 7/04013* (2023.05); *H04B 1/401* (2013.01); *H04L 5/0048* (2013.01)

(58) Field of Classification Search
CPC ... H04B 7/04013; H04B 1/401; H04L 5/0048; H04W 16/26; H04W 84/047
See application file for complete search history.

(56) References Cited

U.S. PATENT DOCUMENTS

| 7,061,447 | B1 | 6/2006 | Bozler et al. |
| 11,251,537 | B2 * | 2/2022 | Sciancalepore ...... H01Q 15/148 |
| 2012/0320819 | A1 * | 12/2012 | Kim .................. H04B 7/15542 370/315 |
| 2017/0373743 | A1 | 12/2017 | Park et al. |
| 2020/0280365 | A1 | 9/2020 | Abedini et al. |

(Continued)

FOREIGN PATENT DOCUMENTS

| CN | 110099423 A | 8/2019 |
| CN | 111108792 A | 5/2020 |
| CN | 111245494 A | 6/2020 |

(Continued)

OTHER PUBLICATIONS

International Search Report issued in corresponding International Application No. PCT/CN2021/129117, mailed Jan. 26, 2022, 4 pages.

(Continued)

*Primary Examiner* — Chandrahas B Patel
(74) *Attorney, Agent, or Firm* — IPX PLLC

(57) ABSTRACT

A working mode indicating method and apparatus and a device are provided. The method includes: receiving first information sent by a network side device, where the first information indicates an RIS working mode or a relay working mode.

18 Claims, 7 Drawing Sheets

(56) References Cited

U.S. PATENT DOCUMENTS

2020/0337115 A1* 10/2020 Qin ...................... H04W 88/04

FOREIGN PATENT DOCUMENTS

| CN | 111787558 A | 10/2020 |
|---|---|---|
| CN | 111867014 A | 10/2020 |
| WO | 2020087292 A1 | 5/2020 |

OTHER PUBLICATIONS

Extended European Search Report issued in related European Application No. 21888670.3, mailed Mar. 12, 2024, 8 pages.
First Office Action issued in related Chinese Application No. 202011233776.X, mailed Jul. 7, 2024, 10 pages.
Jianwen Yao et al "Smart reflective surfaces—a promising 6G technology", Telecom Express, vol. 07; Jul. 2020, 6 pages.
Ruya Zhou et al "A brief review of mobile communications based on reconfigurable smart surfaces", mobile communications, vol. 6; Jun. 2020, 6 pages.

* cited by examiner

Receive first information, where the first information indicates an RIS working mode or a relay working mode ⌐ 301

Send first information, where the first information indicates an RIS working mode or a relay working mode  401

METHOD AND APPARATUS AND DEVICE FOR INDICATING RECONFIGURABLE INTELLIGENT SURFACE (RIS) WORKING MODE

CROSS-REFERENCE TO RELATED APPLICATIONS

The present application is a continuation of International Application No. PCT/CN2021/129117, filed on Nov. 5, 2021, which claims priority to Chinese Patent Application No. 202011233776.X, filed on Nov. 6, 2020. The entire contents of each of the above-identified applications are expressly incorporated herein by reference.

TECHNICAL FIELD

The present application belongs to the field of communication technologies, and specifically relates to a method and an apparatus for indicating a working mode of a Reconfigurable Intelligent Surface (RIS) and a device.

BACKGROUND

An intelligent surface device consists of a massive device array and an array control module. The massive device array is a large amount of device units that are regularly and repeatedly arranged on a planar baseboard. To achieve a considerable signal control effect, hundreds or thousands of device units are usually required to form the device array. Each device unit has a variable device structure. For example, the device unit includes a Positive-Intrinsic-Negative (PIN) diode, and a response mode of the device unit for an external wireless signal depends on a switch state of the PIN diode. The array control module of the intelligent surface may control a working state of each device unit, to dynamically or semi-statically control a response mode of each device unit for a wireless signal. Wireless response signals of the device units of the massive device array are superposed to each other, forming a specified beam propagation feature in a macro sense. The control module is a "brain" of the intelligent surface device, and determines a wireless signal response beam of the intelligent surface according to a requirement of a communications system, so that an original static communication environment becomes "intelligent" and "controllable".

A working mode of the RIS corresponds to the emission or transmission effect of the RIS on an incident signal, and the emission or transmission effect can be controlled by switch patterns of diodes corresponding to all units of the RIS. For example, the switch patterns of diodes corresponding to all units of each RIS correspond to a working mode of the RIS. In a same RIS working mode, if an incident wave and a reflected wave are exchanged, the reflection effect of the RIS on an incident signal is symmetrical or equivalent to some extent. For example, in a same working mode, a base station sends a signal to the RIS, and the RIS reflects the signal to the terminal. If the signal is transmitted from the UE, the base station can also receive the signal transmitted by the RIS. That is, the RIS working mode has uplink and downlink symmetry. However, the uplink and downlink symmetry of the RIS working mode affects downlink signal reception and uplink signal transmission of the same terminal. Similarly, there are similar problems in a relay working mode.

Therefore, how to indicate the working mode of the RIS or the relay is an urgent problem to be solved.

SUMMARY

The embodiments of the present application are to provide a working mode indicating method and apparatus and device, so as to indicate the working mode of the RIS or the relay.

In a first aspect, there is provided a working mode indicating method, performed by a first device, where the first device is a terminal, or the first device is an RIS node or a relay node. The method includes:
  receiving first information sent by a network side device, where the first information indicates an RIS working mode or a relay working mode.

In a second aspect, there is provided a working mode indicating method, performed by a network side device, including:
  sending first information, where the first information indicates an RIS working mode or a relay working mode.

In a third aspect, there is provided a working mode indicating apparatus, including:
  a first receiving module, configured to receive first information, where the first information indicates an RIS working mode or a relay working mode.

In a fourth aspect, there is provided a working mode indicating apparatus, including:
  a first sending module, configured to send first information, where the first information indicates an RIS working mode or a relay working mode.

In a fifth aspect, there is provided a first device. The first device is a terminal, or the first device is an RIS node or a relay node, including: a processor, a memory, and a program stored in the memory and executable on the processor, and when the program is executed by the processor, the step of the method according to the first aspect is performed.

In a sixth aspect, there is provided a network side device. The network side device includes: a processor, a memory, and a program stored in the memory and executable on the processor, and when the program is executed by the processor, the step of the method according to the second aspect is performed.

In a seventh aspect, a readable storage medium is provided. The readable storage medium stores a program or an instruction, and when the program or the instruction is executed by a processor, the step of the method according to the first aspect or the second aspect is performed.

In an eighth aspect, a computer program product is provided, the computer program product is stored in a non-volatile storage medium, and when the computer program product is executed by at least one processor, the step of the method according to the first aspect or the second aspect is performed.

In a ninth aspect, a chip is provided, the chip includes a processor and a communication interface, the communication interface is coupled to the processor, and the processor is used to run programs or instructions, so as to implement the processing method according to the first aspect or the second aspect.

In the embodiments of the present application, the network side indicates the RIS working mode or relay working mode, so that the uplink transmission and downlink reception of the same terminal use the same RIS working mode or relay working mode.

DETAILED DESCRIPTION

Figure 1A:
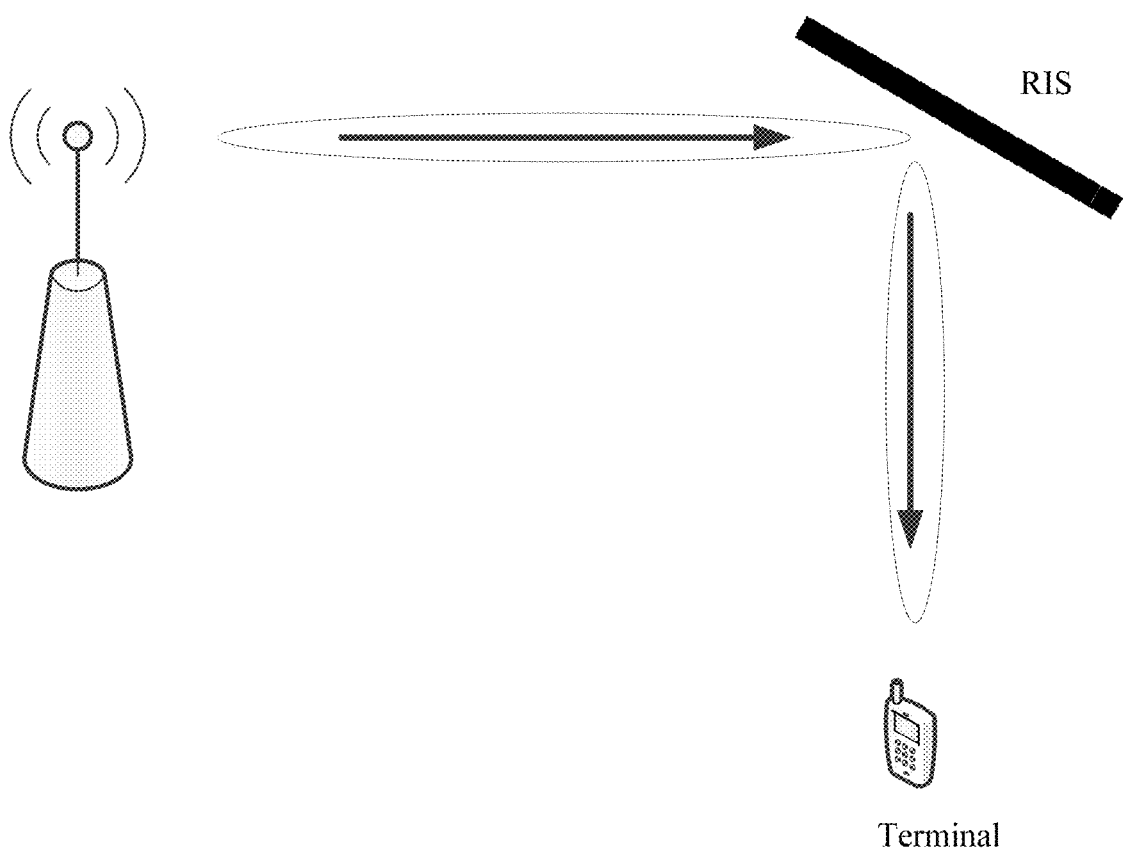
FIG. 1a and FIG. 1b are schematic diagrams of uplink and downlink symmetry of an RIS working mode.

The following describes the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The terms "first," "second," and the like in the specification and claims of the present application are used to distinguish between similar objects instead of describing a designated order or sequence. It should be understood that, data used in this way is interchangeable in proper circumstances, so that the embodiments of the present application can be implemented in an order other than the order illustrated or described herein. Objects classified by "first" and "second" are usually of a same type, and the number of objects is not limited. For example, there may be one or more first objects. In addition, "and" in the specification and claims represents at least one of connected objects. Symbol "/" generally represents an "or" relationship between associated objects.

It should be noted that, the technologies described in the embodiments of the present application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of the present application may be used interchangeably. The described technologies can be applied to both the systems and the radio technologies mentioned above as well as to other systems and radio technologies. However, a New Radio (NR) system is described in the following description for illustrative purposes, and the NR terminology is used in most of the following description, although these technologies can also be applied to applications other than the NR system application, such as the 6th generation (6G) communications system.

In order to facilitate the understanding of the embodiments of the present application, the following technical points are introduced first:

1. Intelligent Surface/Metamaterial Surface

Intelligent surfaces are an emerging technology. There are several related terms as follows, which all refer to similar technologies or entities. These terms include:

Large Intelligent Surface (LIS);
Intelligent Reflect Array (SRA);
Reconfigurable Reflect Array (RRA);
Intelligent Reflecting Surface (IRS); and
Reconfigurable Intelligent Surface (RIS).

An intelligent surface technology is applied in a plurality of technical fields. There are many different design solutions according to different application scenarios. According to the physical principle of the device unit, the intelligent surface includes tunable resonator variable capacitance type, guided wave waveguide type, element rotation polarization type, and the like. According to the wireless signal output form, the intelligent surface is divided into reflection type intelligent surface and transmission type intelligent surface. According to wireless signal response parameters, the intelligent surface includes phase control intelligent surface, amplitude control intelligent surface, and amplitude phase joint control intelligent surface. According to response parameter control, the intelligent surface is divided into continuous control type and discrete control type. According to the frequency or speed of controlling the amplitude and phase of the intelligent surface, the intelligent surface can be divided into statically, semi-statically, or dynamically controlled intelligent surfaces, where static intelligent surfaces can be applied to existing systems at present, for example, the fourth generation mobile communication technology (4G)/fifth-generation mobile communication technology (5G) system. In view of complexity of design and fabrication of the devices, discrete controlled device units using single radio signal response parameters are generally chosen in the academic community for research. At present, the Intelligent Reflecting Surface (IRS) that is widely discussed in the academic circle is a phase-controlled intelligent surface based on signal reflection. The phase change of 0 or π is realized by controlling the phase of the reflected signal of the device unit with indication information of 1 bit.

Since radio frequency and baseband processing circuits are not required, the intelligent surface device has several advantages over a conventional wireless communication transceiver device:

(1) Smart surface devices have lower costs and implementation complexity.
(2) Smart surface devices have lower power consumption.
(3) The intelligent surface will not introduce additional thermal noise at the receiving end.
(4) Smart surface devices are thin and light, enabling flexible deployment.

The types of RIS reflection units are as follows:
(1) Tunable resonator: A variable capacitor is integrated into a resonator to generate a phase shift by changing a frequency of a frequency-agile patch resonator.
(2) Guided wave control method: In this case, an arriving space wave is coupled to a guided wave by an antenna, and then the guided wave is phase-shifted and re-transmitted, forming an antenna phase shifter.

(3) Rotation technology of circularly polarized waves: A reflection law of electromagnetic waves is used to design.

Reflect arrays/intelligent surfaces can be classified into two types according to whether dynamic control can be performed:

(1) Static reflective array/intelligent surface: The structure and function of the reflective array can be fixed. For an incident wave at an angle, the metasurface unit causes fixed changes in features such as the amplitude, phase, and polarization of the incident wave, to obtain the corresponding reflected wave.

(2) Dynamic reflective array/intelligent surface: The structure and function of the reflective array can be controlled. For an incident wave at an angle, features such as the amplitude, phase, and polarization of the incident wave can be controlled to change differently by programming, to obtain the corresponding reflected wave. To achieve programmable control of reflective metasurfaces, switch elements (such as diodes) need to be introduced into reflective units. The PIN diode is currently a common option for controlling a reconfigurable hypersurface. The PIN diode has a relatively wide range of radio frequency impedance and low distortion, and is widely used in the microwave radio frequency field. The switch element in the reflection unit has a plurality of different states, and switching of different states can be implemented by controlling on/off of the switch element. In on and off cases of the switch element, a structure and performance of the corresponding reflection unit changes greatly. That is, reflection units in different states have different regulation modes for characteristics such as an amplitude, a phase, and polarization of the incident wave.

2. Passive Intelligent Surface:

Since the intelligent surface includes a large number of device units and has no radio frequency and baseband processing capabilities, this type of intelligent surface is called a passive intelligent surface.

3. Active and Passive Intelligent Surfaces (or Active Intelligent Surfaces):

Since the intelligent surface is composed of a large amount of component units and does not have a radio frequency and baseband processing capability, the base station cannot separately obtain channel information from the base station to the intelligent surface and from the intelligent surface to the terminal. A receive signal of the base station or the terminal is formed by superimposing response signals of a large amount of component units of the intelligent surface, and changing a working state of one component unit or a small amount of component units does not cause a significant change of the receive signal. A possible measurement scheme is to install a small amount of active component units in the intelligent surface, so that the intelligent surface can perform channel measurement and feedback. The base station calculates a reasonable intelligent surface configuration parameter from limited channel information by using a compression sensing or deep learning algorithm. An intelligent surface-based communications system needs an efficient channel measurement mechanism, to improve end-to-end signal quality as much as possible while ensuring low complexity of the intelligent surface. This intelligent surface on which some active components are installed has a capability of receiving and even sending a signal, and is an active and passive intelligent surface (or an active intelligent surface).

4. Uplink and Downlink Symmetry of an RIS Working Mode:

A working mode of the RIS corresponds to the emission or transmission effect of the RIS on an incident signal, and the emission or transmission effect can be controlled by switch patterns of diodes corresponding to all units of the RIS. For example, the switch patterns of diodes corresponding to all units of each RIS correspond to a working mode of the RIS.

Generally, an RIS can only work in one mode at a time.

Figure 1B:
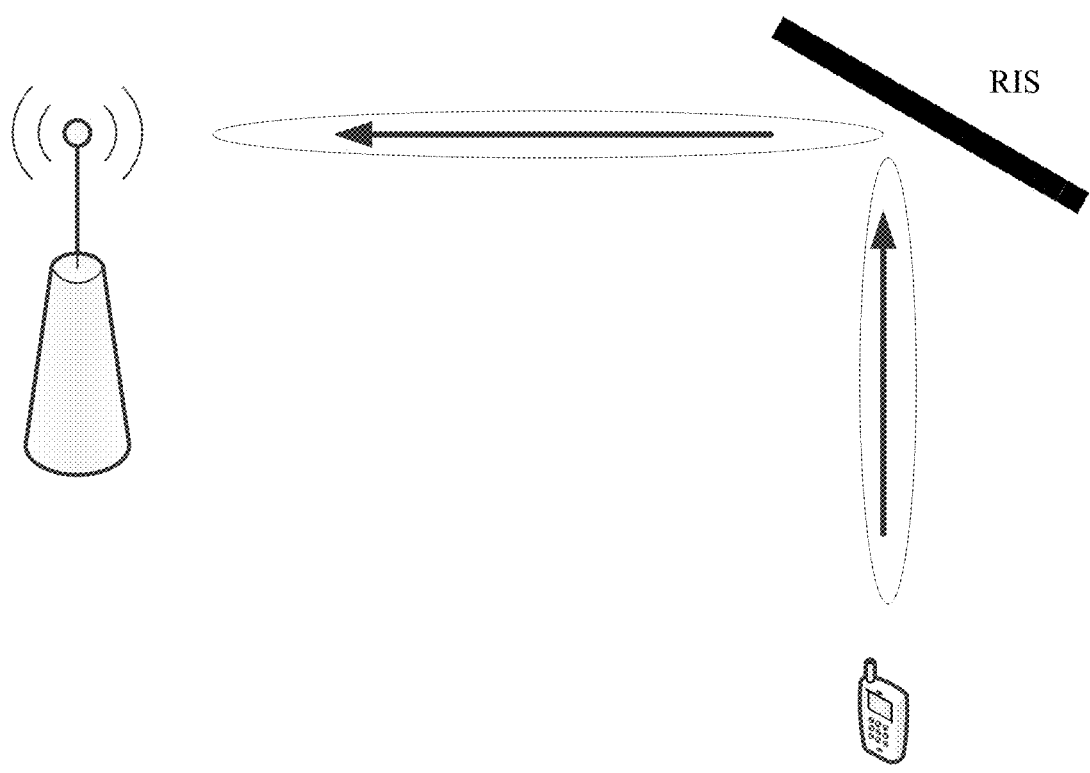

In a same working mode, as shown in FIG. 1a and FIG. 1b, a base station sends a signal to an RIS, and the RIS reflects the signal to a terminal. At this time, the RIS works in working mode 1.

Similarly, in the RIS working mode 1, if the signal is transmitted from the terminal, the base station can also receive the signal transmitted through the RIS.

That is, in the same RIS working mode, if the incident wave and the reflected wave are exchanged, the reflection effect of the RIS on the incident signal is symmetrical or equivalent to some extent.

5. Uplink and Downlink Subframe/Symbol Ratio in New Radio (NR):

The fifth-generation mobile communication technology (5G) allocates uplink and downlink resource ratios in units of slots or even Orthogonal Frequency Division Multiplex (OFDM) symbols.

The communication system supports the use of cell-specific and terminal-specific (UE specific) Radio Resource Control (RRC) signaling to indicate uplink and downlink subframe ratios of UEs.

The communication system supports flexible adjustment of uplink and downlink resource ratios through Downlink Control Information (DCI) signaling, and 55 standardized structures are predefined (a maximum of 254 structures are reserved).

As shown in Table 1: Taking 14 symbols as an example, D means that the symbol is a downlink symbol, U means that the symbol is an uplink symbol, and F means that the symbol is a flexible symbol (that is, it is not sure whether it is an uplink or downlink symbol).

TABLE 1

| | Number of symbols in a slot | | | | | | | | | | | | | | | | |
| --- | --- | --- | --- | --- | --- | --- | --- | --- | --- | --- | --- | --- | --- | --- | --- | --- | --- |
| Format | 0 | 1 | 2 | 3 | 4 | 5 | 6 | 7 | 8 | 9 | 10 | 11 | 12 | 13 | #DL | #UL | #Flex |
| 0 | D | D | D | D | D | D | D | D | D | D | D | D | D | D | 14 | 0 | 0 |
| 1 | U | U | U | U | U | U | U | U | U | U | U | U | U | U | 0 | 14 | 0 |
| 2 | F | F | F | F | F | F | F | F | F | F | F | F | F | F | 0 | 0 | 14 |
| 3 | D | D | D | D | D | D | D | D | D | D | D | D | D | F | 13 | 0 | 1 |
| 4 | D | D | D | D | D | D | D | D | D | D | D | D | F | F | 12 | 0 | 2 |
| 5 | D | D | D | D | D | D | D | D | D | D | D | F | F | F | 11 | 0 | 3 |
| 6 | D | D | D | D | D | D | D | D | D | D | F | F | F | F | 10 | 0 | 4 |

TABLE 1-continued

| Format | 0 | 1 | 2 | 3 | 4 | 5 | 6 | 7 | 8 | 9 | 10 | 11 | 12 | 13 | #DL | #UL | #Flex |
|---|---|---|---|---|---|---|---|---|---|---|---|---|---|---|---|---|---|
| | | | | | | | Number of symbols in a slot | | | | | | | | | | |
| 7 | D | D | D | D | D | D | D | D | D | F | F | F | F | F | 9 | 0 | 5 |
| 8 | F | F | F | F | F | F | F | F | F | F | F | F | F | U | 0 | 1 | 13 |
| 9 | F | F | F | F | F | F | F | F | F | F | F | F | U | U | 0 | 2 | 12 |
| 10 | F | U | U | U | U | U | U | U | U | U | U | U | U | U | 0 | 13 | 1 |
| 11 | F | F | U | U | U | U | U | U | U | U | U | U | U | U | 0 | 12 | 2 |
| 12 | F | F | F | U | U | U | U | U | U | U | U | U | U | U | 0 | 11 | 3 |
| 13 | F | F | F | F | U | U | U | U | U | U | U | U | U | U | 0 | 10 | 4 |
| 14 | F | F | F | F | F | U | U | U | U | U | U | U | U | U | 0 | 9 | 5 |
| 15 | F | F | F | F | F | F | U | U | U | U | U | U | U | U | 0 | 8 | 6 |
| 16 | D | F | F | F | F | F | F | F | F | F | F | F | F | F | 1 | 0 | 13 |
| 17 | D | D | F | F | F | F | F | F | F | F | F | F | F | F | 2 | 0 | 12 |
| 18 | D | D | D | F | F | F | F | F | F | F | F | F | F | F | 3 | 0 | 11 |
| 19 | D | F | F | F | F | F | F | F | F | F | F | F | F | U | 1 | 1 | 12 |
| 20 | D | D | F | F | F | F | F | F | F | F | F | F | F | U | 2 | 1 | 11 |
| 21 | D | D | D | F | F | F | F | F | F | F | F | F | F | U | 3 | 1 | 10 |
| 22 | D | F | F | F | F | F | F | F | F | F | F | F | U | U | 1 | 2 | 11 |
| 23 | D | D | F | F | F | F | F | F | F | F | F | F | U | U | 2 | 2 | 10 |
| 24 | D | D | D | F | F | F | F | F | F | F | F | F | U | U | 3 | 2 | 9 |
| 25 | D | F | F | F | F | F | F | F | F | F | F | U | U | U | 1 | 3 | 10 |
| 26 | D | D | F | F | F | F | F | F | F | F | F | U | U | U | 2 | 3 | 9 |

Figures 2, 3:
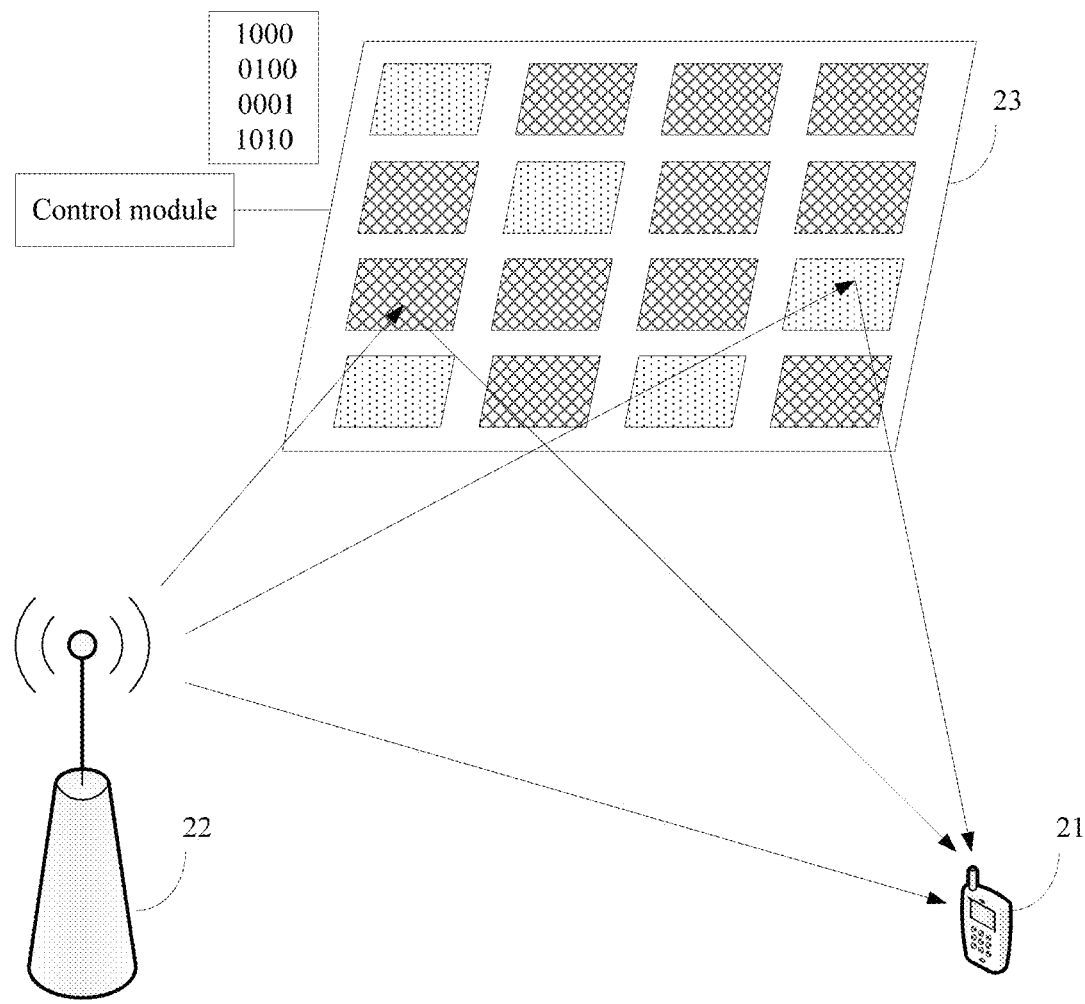
FIG. 2 is a block diagram of a wireless communications system to which an embodiment of the present application is applied.
FIG. 3 is a first flowchart of a working mode indicating method in an embodiment of the present application.

Referring to FIG. 2, FIG. 2 is a block diagram of a wireless communications system to which embodiments of the present application can be applied. The wireless communication system includes a terminal 21, a network side device 22, and an intelligent surface device 23. The terminal 21 may also be called a terminal device or User Equipment (UE), and the terminal 21 may be a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device or a Vehicle-User Equipment (VUE), a Pedestrian-User Equipment (PUE), and other terminal side devices. The wearable device includes: bracelets, earphones, glasses, etc. It should be noted that a specific type of the terminal 21 is not limited in the embodiments of the present application.

The network side device 22 may be a base station or a core network. The base station may be referred to as a node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a Wireless Local Area Network (WLAN) access point, a Wireless Fidelity (WiFi) node, a Transmitting Receiving Point (TRP), a wireless access network node, or other appropriate terms in the art. As long as a same technical effect is achieved, the base station is not limited to a specified technical term. It should be noted that, in embodiments of the present application, only a base station in the NR system is used as an example, but a specific type of the base station is not limited.

With reference to the accompanying drawings, the following describes in detail a working mode indicating method and apparatus, a device, and a readable storage medium in the embodiments of the present application based on specific embodiments and application scenarios.

Referring to FIG. 3, an embodiment of the present application provides a working mode indicating method, executed by a first device. The first device is a terminal, or the first device is an RIS node or a relay node, for example, a layer 1 relay, a layer 2 relay, a layer 3 relay, or an Integrated Access and Backhaul (IAB) node. The method includes: step 301.

Step 301: Receive first information sent by a network side device, where the first information indicates an RIS working mode or a relay working mode.

In some implementations, the first information may also be Radio Resource Control (RRC) signaling; or the first time unit may be each time unit in a specific period, and the time unit may be a slot or a symbol or other time granularity.

In this embodiment of the application, the RIS working mode or the relay working mode is associated with at least one of the following:
(1) beam pointing of a reflected signal or a refracted signal of an RIS or a relay; for example, different working modes correspond to different beam pointing of the reflected signal, or different working modes correspond to different beam pointing of the refracted signal;
(2) a beamforming mode of a reflected signal or a refracted signal of an RIS or a relay; for example, the beamforming mode of the RIS is obtained by adjusting on or off of a diode associated with the RIS unit, that is, different on or off patterns of different diodes correspond to different beamforming modes of the reflected signal or the refracted signal of the RIS, thus corresponding to different RIS working modes,
(3) a polarization manner of a reflected signal or a refracted signal of an RIS or a relay, and the polarization mode includes: horizontal polarization or vertical polarization; for example, different working modes correspond to different polarization modes; and
(4) an Orbital Angular Momentum (OAM) mode of a reflected signal or a refracted signal of an RIS or a relay; for example, different working modes correspond to different OAM modes.

In this embodiment of the present application, the RIS working mode or the relay working mode is Quasi Co-Located (QCL) with at least one of the following:
(1) a Synchronization Signal and PBCH Block (SSB) sent by the network side device;
(2) a Channel State Information Reference Signal (CSI-RS) sent by the network side device;
(3) a Tracking Reference Signal (TRS) sent by the network side device;
(4) a DeModulation Reference Signal (DMRS) sent by the network side device; and (5) a Positioning Reference Signal (PRS) sent by the network side device.

In this embodiment of the present application, the first information further indicates an uplink configuration or a downlink configuration corresponding to the RIS working mode or the relay working mode. That is, the first information may simultaneously indicate the RIS working mode and uplink/downlink configuration of each time unit, for example, time division duplex uplink downlink configuration (tdd-UL-DL-Configuration). The uplink configuration or downlink configuration includes different configurations in Table 1.

In this embodiment of the present application, the first information is cell-specific signaling or terminal-specific signaling.

In this embodiment of the present application, types of the RIS working mode include: a definite working mode and a flexible working mode.

In this embodiment of the present application, the method further includes:
- if the first information indicates that the type of the RIS working mode or the relay working mode is a flexible working mode, receiving second information, where the second information indicates that the RIS working mode or the relay working mode is a first working mode among definite working modes, that is, the second information may further indicate which definite working mode is the uncertain working mode. In some implementations, the second information is layer 1 signaling.

In some implementations, the RIS working mode or the relay working mode is the RIS working mode or the relay working mode in at least a part of time units in one cycle or multiple cycles.

The uplink and downlink symmetry of the RIS working mode affects the downlink signal reception and uplink signal transmission of the same UE, because the working mode of the RIS at a moment of downlink signal reception and uplink signal transmission of the same UE needs to be the same. In the embodiments of the present application, the following steps are performed:
- if the RIS working mode or the relay working mode is the RIS working mode or the relay working mode on at least a part of time units in one cycle, a number of time units with a same RIS working mode or relay working mode in the one cycle is greater than 1; and if the RIS working mode or the relay working mode is the RIS working mode or the relay working mode on at least a part of time units in multiple cycles, a number of time units with a same RIS working mode or relay working mode in each of the multiple cycles is greater than 1.

In this embodiment of the present application, the first device is an RIS or a relay node, and the method further includes: updating a working mode according to the first information.

In this embodiment of the present application, the first device is a terminal, and the method further includes: performing corresponding transmission according to the RIS working mode or relay working mode indicated by the first information.

In this embodiment of the present application, the performing corresponding transmission according to the RIS working mode or relay working mode indicated by the first information includes one of the following:

performing a two-step random access process or a four-step random access process according to the RIS working mode or the relay working mode indicated by the first information;

performing uplink data or downlink data transmission according to the RIS working mode or the relay working mode indicated by the first information; and performing a Hybrid Automatic Repeat reQuest (HARQ) process according to the RIS working mode or the relay working mode indicated by the first information.

In this embodiment of the present application, the performing a four-step random access process according to the RIS working mode or the relay working mode indicated by the first information includes:
determining the index of the target SSB; sending MSG1 at a first moment, where an RIS working mode or a relay working mode at the first moment is the same as an RIS working mode or a relay working mode corresponding to a moment of the target SSB, and the first moment corresponds to a random access occasion associated with an index of the target SSB; and listen to message 2 (MSG2) at a second moment after the terminal sends message 1 (MSG1); where an RIS working mode or a relay working mode at the second moment is the same as an RIS working mode or a relay working mode corresponding to a moment of MSG1.

In this embodiment of the present application, the method further includes: sending message 3 (MSG3) at a third moment after the terminal listens to message 2; where an RIS working mode or a relay working mode at the third moment is the same as an RIS working mode or a relay working mode corresponding to a moment of the message 2; and receiving a message 4 (MSG4) at a fourth moment after the terminal sends MSG3; where an RIS working mode or a relay working mode at the fourth moment is the same as an RIS working mode or a relay working mode corresponding to a moment of MSG3.

In this embodiment of the present application, the performing a two-step random access process according to the RIS working mode or the relay working mode indicated by the first information includes:
determining the index of the target SSB; sending a preamble of message A (MSGA) at a fifth moment, where an RIS working mode or a relay working mode at the fifth moment is the same as an RIS working mode or a relay working mode corresponding to a moment of the target SSB, and the fifth moment corresponds to a random access occasion associated with an index of the target SSB; sending MSGA at a sixth moment, where an RIS working mode or a relay working mode at the sixth moment is the same as an RIS working mode or a relay working mode corresponding to a moment of the target SSB; and listening to message B (MSGB) at a seventh moment after MSGA is sent, where an RIS working mode or a relay working mode at the seventh moment is the same as an RIS working mode or a relay working mode corresponding to a moment of MSGA.

In this embodiment of the present application, the performing uplink data or downlink data transmission according to the RIS working mode indicated by the first information includes:
receiving fourth information; determining the index of the target SSB; and receiving downlink data or sending uplink data at an eighth moment, where the eighth moment belongs to a time resource that is used for receiving downlink data or sending uplink data and that is indicated by the fourth information, and an RIS working mode or a relay working mode at the eighth moment is the same as an RIS working mode or a relay working mode at a moment of the index of the target SSB.

In this embodiment of the present application, the performing the HARQ process according to the RIS working mode or the relay working mode indicated by the first information includes:

sending, at a ninth moment, an ACKnowledgment (ACK) or a Negative ACKnowledgment (NACK) corresponding to a first channel, where an RIS working mode or a relay working mode at the ninth moment is the same as an RIS working mode or a relay working mode at a moment when the first channel is transmitted; where the first channel is a Physical Downlink Control CHannel (PDCCH)/a Physical Downlink Shared CHannel (PDSCH).

In some implementations, the ninth moment is selected independently, or determined based on network side configuration.

In the embodiments of the present application, the network side indicates the RIS working mode or relay working mode, so that the uplink transmission and downlink reception of the same terminal use the same RIS working mode or relay working mode, which solves the impact of the uplink and downlink symmetry of the RIS working mode or relay working mode on the downlink signal reception and uplink signal transmission of the same terminal.

Figures 4, 5:
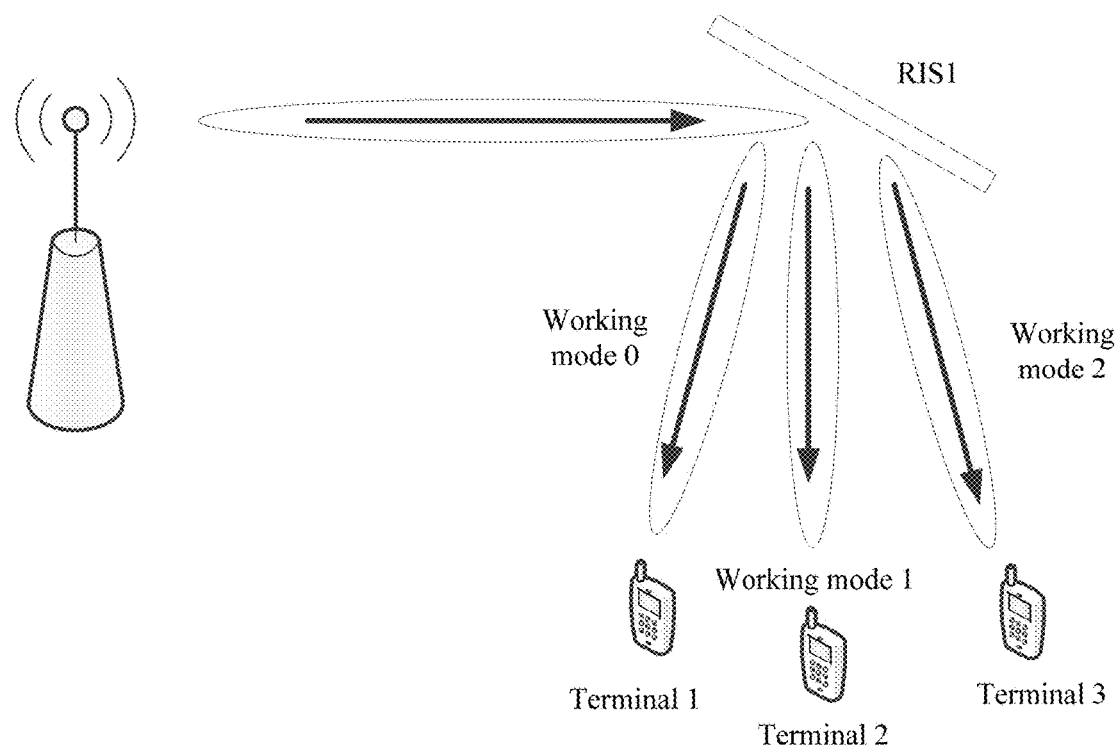
FIG. 4 is a second flowchart of a working mode indicating method in an embodiment of the present application.
FIG. 5 is a schematic diagram of indicating an RIS working mode in an embodiment of the present application.

Referring to FIG. 4, an embodiment of the present application provides a working mode indicating method, executed by a network side device, and the specific steps include: step 401.

Step 401: Send first information, where the first information indicates an RIS working mode or a relay working mode.

For example, the first information is sent to the terminal, or the first information is sent to the RIS or the relay.

In this embodiment of the application, the RIS working mode or the relay working mode is associated with at least one of the following: (1) beam pointing of a reflected signal or a refracted signal of an RIS or a relay; (2) a beamforming mode of a reflected signal or a refracted signal of an RIS or a relay; (3) a polarization manner of a reflected signal or a refracted signal of an RIS or a relay; and (4) an OAM manner of a reflected signal or a refracted signal of an RIS or a relay.

In this embodiment of the application, the RIS working mode or relay working mode is quasi-co-located with at least one of the following: (1) an SSB sent by the network side device, (2) a CSI-RS sent by the network side device, (3) a TRS sent by the network-side device, (4) a DMRS sent by the network-side device, and (5) a PRS sent by the network-side device.

In this embodiment of the present application, the first information further indicates an uplink configuration or a downlink configuration corresponding to the RIS working mode or the relay working mode.

In this embodiment of the present application, the first information is cell-specific signaling or terminal-specific signaling.

In this embodiment of the present application, types of the RIS working mode or the relay working mode include: a definite working mode and a flexible working mode.

In this embodiment of the present application, the method further includes: if the first information indicates that the type of the RIS working mode or the relay working mode is a flexible working mode, sending second information, where the second information indicates that the RIS working mode or the relay working mode is a first working mode among uncertain working modes. In some implementations, the second information is layer 1 signaling.

In this embodiment of the present application, the RIS working mode or the relay working mode is the RIS working mode or the relay working mode in at least a part of time units in one cycle or multiple cycles.

In the embodiments of the present application, the network side indicates the RIS working mode or relay working mode, so that the uplink transmission and downlink reception of the same terminal use the same RIS working mode or relay working mode, which solves the impact of the uplink and downlink symmetry of the RIS working mode or relay working mode on the downlink signal reception and uplink signal transmission of the same terminal.

The following uses four manners to introduce the manner of indicating the RIS working mode:

Manner 1:

Indicate the RIS working mode through base station System Information Blocks (SIB) (cell specific) or RRC signaling (UE specific). The RIS working mode at each moment is determinate. The RRC signaling (UE specific) may replace the uncertain working mode indicated by the SIB (cell specific) signaling, for example, indicating that the uncertain working mode is working mode 1.

In some implementations, the tdd-UL-DL-Configuration is indicated through additional signaling.

As shown in Table 2: the RIS working mode can be indicated through SIB or RRC signaling.

TABLE 2

| Slot or symbol index | 0 | 1 | 2 | 3 | 4 | 5 | 6 | 7 | 8 | 9 |
|---|---|---|---|---|---|---|---|---|---|---|
| RIS working mode | 0 | 1 | 2 | 1 | 2 | 0 | 1 | 2 | 0 | 0 |

For example, SIB or RRC signaling indicates: the RIS working mode of the slot or symbol with index 0 is working mode 0, and the RIS working mode of the slot or symbol with index 1 is working mode 1, the RIS working mode of the slot or symbol with index 2 is working mode 2, and the RIS working mode of the slot or symbol with index 3 is a working mode 1, and the RIS working mode of the slot or symbol with index 4 is a working mode 2, the RIS working mode of the slot or symbol with index 5 is working mode 0, and the RIS working mode of the slot or symbol with index 6 is working mode 1, the RIS working mode of the slot or symbol with index 7 is working mode 2, and the RIS working mode of the slot or symbol with index 8 is a working mode 0, and the RIS working mode of the slot or symbol with index 9 is a working mode 0.

Figure 6:
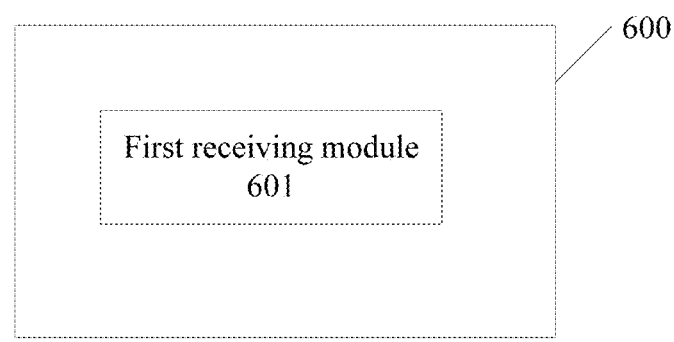
FIG. 6 is a first schematic diagram of a working mode indicating apparatus in an embodiment of the present application.

Referring to FIG. 6, SIB or RRC signaling indicates that the RIS working mode of terminal 1 is working mode 0, indicates that the RIS working mode of terminal 2 is working mode 1, and indicates that the RIS working mode of terminal 3 is working mode 2.

Manner 2:

Indicate the RIS working mode through base station SIB (cell specific) or RRC signaling (UE specific). The RIS working modes of some time units are uncertain. The RRC signaling (UE specific) may replace the uncertain working mode indicated by the SIB (cell specific) signaling, for example, indicating that the uncertain working mode is working mode 1.

Then, the layer 1 signaling indicates which working mode the uncertain working mode is.

In some implementations, the tdd-UL-DL-Configuration is indicated through additional signaling.

As shown in Table 3: RIS working modes that can be indicated through SIB or RRC signaling (indicate which working mode is the pending/flexible working mode through layer 1 signaling).

TABLE 3

| Slot or symbol index | 0 | 1 | 2 | 3 | 4 | 5 | 6 | 7 | 8 | 9 |
|---|---|---|---|---|---|---|---|---|---|---|
| RIS working mode | 0 | 1 | 2 | F | F | 0 | 1 | 2 | F | F |

F represents an uncertain RIS working mode, or an uncertain/pending/flexible working mode.

For example, SIB or RRC signaling indicates: the RIS working mode of the slot or symbol with index 0 is working mode 0, and the RIS working mode of the slot or symbol with index 1 is working mode 1, the RIS working mode of the slot or symbol with index 2 is working mode 2, and the RIS working mode of the slot or symbol with index 3 is an uncertain working mode, and the RIS working mode of the slot or symbol with index 4 is an uncertain working mode, the RIS working mode of the slot or symbol with index 5 is working mode 0, and the RIS working mode of the slot or symbol with index 6 is working mode 1, the RIS working mode of the slot or symbol with index 7 is working mode 2, and the RIS working mode of the slot or symbol with index 8 is an uncertain working mode, and the RIS working mode of the slot or symbol with index 9 is an uncertain working mode.

Manner 3:

Indicate the RIS working mode and tdd-UL-DL-Configuration at the same time through the base station SIB (cell specific) or RRC signaling (UE specific).

The RRC signaling (UE specific) may replace the uncertain working mode indicated by the SIB (cell specific) signaling, for example, indicating that the uncertain working mode is working mode 1.

The RIS working mode of each time unit is determinate.

As shown in Table 4: RIS working modes that can be indicated through SIB or RRC signaling (indicate which working mode is the pending/flexible working mode through layer 1 signaling).

TABLE 4

| Slot or symbol index | 0 | 1 | 2 | 3 | 4 | 5 | 6 | 7 | 8 | 9 |
|---|---|---|---|---|---|---|---|---|---|---|
| DL/UL | D | D | S | U | U | D | S | U | F | F |
| RIS working mode | 0 | 1 | 2 | 1 | 2 | 0 | 1 | 2 | 0 | 0 |

For example, SIB or RRC signaling indicates: the RIS working mode of the slot or symbol with index 0 is working mode 0, the slot or symbol is a downlink slot or symbol, and the RIS working mode of the slot or symbol with index 1 is working mode 1, the slot or symbol is a downlink slot or symbol, the RIS working mode of the slot or symbol with index 2 is working mode 2, the slot or symbol is a special slot or special symbol, and the RIS working mode of the slot or symbol with index 3 is an uncertain working mode, and the slot or symbol is an uplink slot or symbol, and the RIS working mode of the slot or symbol with index 4 is an uncertain working mode, and the slot or symbol is an uplink slot or symbol, the RIS working mode of the slot or symbol with index 5 is working mode 0, the slot or symbol is a downlink slot or symbol, and the RIS working mode of the slot or symbol with index 6 is working mode 1, the slot or symbol is S, the RIS working mode of the slot or symbol with index 7 is working mode 2, the slot or symbol is an uplink slot or symbol, and the RIS working mode of the slot or symbol with index 8 is an uncertain working mode, the slot or symbol is a flexible slot or symbol, and the RIS working mode of the slot or symbol with index 9 is an uncertain working mode, and the slot or symbol is a flexible slot or symbol. The DL/UL in manner 3 can be different configurations in Table 1.

Manner 4:

Indicate the RIS working mode and tdd-UL-DL-Configuration simultaneously through the base station SIB (cell specific) or RRC signaling (UE specific). Among them, RRC signaling (UE specific) can replace the uncertain working mode indicated by SIB (cell specific) signaling, for example, indicating that the uncertain working mode is working mode 1.

The RIS working modes of some time units are uncertain.

Further, the layer 1 signaling indicates which working mode the uncertain RIS working mode is.

As shown in Table 5, layer 1 signaling can simultaneously indicate which working mode the uncertain RIS working mode is, and which symbol/slot (uplink or downlink) the uncertain uplink and downlink symbols/slots are.

TABLE 5

| Slot or symbol index | 0 | 1 | 2 | 3 | 4 | 5 | 6 | 7 | 8 | 9 |
|---|---|---|---|---|---|---|---|---|---|---|
| DL/UL | D | D | S | U | U | D | S | U | F | F |
| RIS working mode | 0 | 1 | 2 | F | F | 0 | 1 | 2 | F | F |

For example, SIB or RRC signaling indicates: the RIS working mode of the slot or symbol with index 0 is working mode 0, the slot or symbol is a downlink slot or symbol, and the RIS working mode of the slot or symbol with index 1 is working mode 1, the slot or symbol is a downlink slot or symbol, the RIS working mode of the slot or symbol with index 2 is working mode 2, the slot or symbol is a special slot or special symbol, and the RIS working mode of the slot or symbol with index 3 is an uncertain working mode, and the slot or symbol is an uplink slot or symbol, and the RIS working mode of the slot or symbol with index 4 is an uncertain working mode, and the slot or symbol is an uplink slot or symbol, the RIS working mode of the slot or symbol with index 5 is working mode 0, the slot or symbol is a downlink slot or symbol, and the RIS working mode of the slot or symbol with index 6 is working mode 1, the slot or symbol is a special slot or special symbol, the RIS working mode of the slot or symbol with index 7 is working mode 2, the slot or symbol is an uplink slot or symbol, and the RIS working mode of the slot or symbol with index 8 is an uncertain working mode, the slot or symbol is a flexible slot or symbol, and the RIS working mode of the slot or symbol with index 9 is an uncertain working mode, and the slot or symbol is a flexible slot or symbol. The DL/UL in manner 4 can be different configurations in Table 1.

Four application scenarios of the RIS working mode indication method are introduced below in conjunction with Embodiment 1 to Embodiment 4.

Embodiment 1: Four-Step Random Access CHannel (RACH)

After measuring and determining the index of the target SSB (for example, selecting an SSB whose Reference Signal Received Power (RSRP) meets a threshold as the index of the target SSB), at a Random access Occasion (RO) associated with the SSB, and at a time unit in which the RIS working mode is the same as the RIS working mode corresponding to the SSB index, MSG1 is sent. In some implementations, after the UE determines
- that the UE sends MSG1, in the first time window, at a time unit in which the RIS working mode is the same as the RIS working mode corresponding to MSG1, MSG2 is listened to, and
- after the UE listens to MSG2, it sends MSG3 at the time unit indicated by MSG2.

In some implementations, the RIS working mode corresponding to the time unit is the same as the RIS working mode corresponding to MSG2.

After the UE sends MSG3, in the second time window, at a time unit in which the RIS working mode is the same as the RIS working mode corresponding to MSG3, MSG4 is received.

The UE determines, according to one of the above four indication manners, the RIS working mode corresponding to each time unit.

Embodiment 2: Two-Step RACH

After measuring and determining the index of the target SSB (for example, selecting the SSB whose RSRP meets a certain threshold as the index of the target SSB), at the RO associated with the SSB, at a time unit in which the RIS working mode is the same as the RIS working mode corresponding to the SSB index, the preamble of MSGA is sent.

The UE sends a Physical Uplink Shared CHannel (PUSCH) of MSGA in a time unit in which the RIS working mode is the same as the RIS working mode corresponding to the SSB index.

After the UE sends MSGA, in the third time window, at a time unit in which the RIS working mode is the same as the RIS working mode corresponding to MSGA, MSGB is listened to.

The UE determines, according to one of the above four indication manners, the RIS working mode corresponding to each time unit.

Embodiment 3. Configuration Related to Configured Scheduling/Grant Free

The UE receives base station signaling, such as RRC signaling or layer 1 (L1) signaling.

The RRC signaling or L1 signaling a time-frequency resource used by the UE to receive downlink data/send uplink data at multiple moments, Modulation and Coding Scheme (MCS) and other information.

The UE (periodically) measures and determines the index of the target SSB (for example, selects the SSB whose RSRP meets a certain threshold as the index of the target SSB).

According to the time resource (the first condition) for receiving downlink data/sending uplink data indicated by RRC signaling or L1 signaling, the UE receives downlink data/send uplink data at a moment at which the RIS working mode is the same as the RIS working mode corresponding to a moment of the target SSB index (the second condition).

Embodiment 4: PDSCH and Corresponding ACKnowledgment (ACK)/Negative ACKnowledgment (NACK)

On the basis that the UE determines the ACK/NACK transmission time according to the existing technology, it also needs to be satisfied that the RIS working mode at the ACK/NACK transmission time is the same as the RIS working mode at a moment of the associated Physical Downlink Control CHannel (PDCCH)/Physical Downlink Shared CHannel (PDSCH).

In some implementations, the UE may autonomously select the ACK/NACK transmission time that meets the conditions, or the base station indicates, for example, through the PDCCH, the ACK/NACK transmission time that meets the condition.

It can be understood that the RIS in the above embodiment can also be a relay (relay), such as layer 1 relay, layer 2 relay, layer 3 relay, or an integrated access and backhaul (IAB) node.

Referring to FIG. 6, an embodiment of the present application provides a working mode indicating apparatus, and the apparatus 600 includes:
- a first receiving module 601, configured to receive first information sent by a network side device, where the first information indicates an RIS working mode or a relay working mode.

In this embodiment of the present application, the apparatus 600 further includes:
- an update module, configured to update the working mode according to the first information.

In this embodiment of the present application, the apparatus 600 further includes:
- an executing module, configured to perform corresponding transmission according to the RIS working mode or relay working mode indicated by the first information.

In this embodiment of the application, the RIS working mode or the relay working mode is associated with at least one of the following:
  (1) beam pointing of a reflected signal or a refracted signal of an RIS or a relay;
  (2) a beamforming mode of a reflected signal or a refracted signal of an RIS or a relay;
  (3) a polarization manner of a reflected signal or a refracted signal of an RIS or a relay; and
  (4) an OAM manner of a reflected signal or a refracted signal of an RIS or a relay.

In this embodiment of the present application, the RIS working mode or the relay working mode is quasi-co-located with at least one of the following: an SSB sent by the network side device, a CSI-RS sent by the network side device, a TRS sent by the network side device, a DMRS sent by the network side device, and a PRS sent by the network side device.

In this embodiment of the present application, the first information further indicates an uplink configuration or a downlink configuration corresponding to the RIS working mode or the relay working mode.

In this embodiment of the present application, the first information is cell-specific signaling or terminal-specific signaling.

In this embodiment of the present application, types of the RIS working mode or the relay working mode include: a definite working mode and a flexible working mode.

In the embodiment of the present application, the apparatus further includes:
  a second receiving module, configured to: if the first information indicates that the type of the RIS working mode or the relay working mode is a flexible working mode, receive second information, where the second information indicates that the RIS working mode or the relay working mode is a first working mode among definite working modes.

In this embodiment of the present application, the second information is layer 1 signaling.

In this embodiment of the present application, the RIS working mode or the relay working mode is the RIS working mode or the relay working mode in at least a part of time units in one cycle or multiple cycles.

In this embodiment of the present application, if the RIS working mode or the relay working mode is the RIS working mode or the relay working mode on at least a part of time units in one cycle, a number of time units with a same RIS working mode or relay working mode in the one cycle is greater than 1; and if the RIS working mode or the relay working mode is the RIS working mode or the relay working mode on at least a part of time units in multiple cycles, a number of time units with a same RIS working mode or relay working mode in each of the multiple cycles is greater than 1.

In this embodiment of the present application, the executing module is further configured to: performing a two-step random access process or a four-step random access process according to the RIS working mode or the relay working mode indicated by the first information; performing uplink data or downlink data transmission according to the RIS working mode or the relay working mode indicated by the first information; and performing an HARQ process according to the RIS working mode or the relay working mode indicated by the first information.

In this embodiment of the present application, the executing module includes:
- a determining unit, configured to determine an index of a target SSB;
- a first sending unit, configured to send message 1 at a first moment, where an RIS working mode or a relay working mode at the first moment is the same as an RIS working mode or a relay working mode corresponding to a moment of the target SSB, and the first moment corresponds to a random access occasion associated with an index of the target SSB; and
- a first monitoring unit, configured to listen to message 2 at a second moment after the terminal sends message 1;
- where an RIS working mode or a relay working mode at the second moment is the same as an RIS working mode or a relay working mode corresponding to a moment of message 1.

In this embodiment of the present application, the executing module further includes:
- a second sending unit, configured to send message 3 at a third moment after the terminal listens to message 2; where an RIS working mode or a relay working mode at the third moment is the same as an RIS working mode or a relay working mode corresponding to a moment of the message 2; and
- a first receiving unit, configured to receive MSG4 at a fourth moment after the terminal sends MSG3;
- where an RIS working mode or a relay working mode at the fourth moment is the same as an RIS working mode or a relay working mode corresponding to a moment of MSG3.

In this embodiment of the present application, the executing module includes:
- a second determination unit, configured to determine the index of the target SSB;
- a third sending unit, configured to send a preamble of MSGA at a fifth moment, where an RIS working mode or a relay working mode at the fifth moment is the same as an RIS working mode or a relay working mode corresponding to a moment of the target SSB, and the fifth moment corresponds to a random access occasion associated with an index of the target SSB;
- a third sending unit, configured to send MSGA at a sixth moment, where an RIS working mode or a relay working mode at the sixth moment is the same as an RIS working mode or a relay working mode corresponding to a moment of the target SSB; and
- a second monitoring unit, configured to listen to MSGB at a seventh moment after MSGA is sent, where an RIS working mode or a relay working mode at the seventh moment is the same as an RIS working mode or a relay working mode corresponding to a moment of MSGA.

In this embodiment of the present application, the executing module includes:
- a second receiving unit, configured to receive fourth information;
- a third determining unit, configured to determine an index of a target SSB; and
- a transceiver unit, configured to receive downlink data or send uplink data at an eighth moment, where the eighth moment belongs to a time resource that is used for receiving downlink data or sending uplink data and that is indicated by the fourth information, and an RIS working mode or a relay working mode at the eighth moment is the same as an RIS working mode or a relay working mode at a moment of the index of the target SSB.

In this embodiment of the present application, the executing module is further configured to: send, at a ninth moment, an acknowledgment or a negative acknowledgment corresponding to a first channel, where an RIS working mode or a relay working mode at the ninth moment is the same as an RIS working mode or a relay working mode at a moment when the first channel is transmitted; where the first channel is a physical downlink control channel or a physical downlink shared channel.

In this embodiment of the present application, the ninth moment is selected independently, or determined based on network side configuration.

The apparatus according to embodiments of the present disclosure can implement the processes in the method embodiments in FIG. 3, and achieve the same technical effect. To avoid repetition, details are not described herein again.

Figure 7:
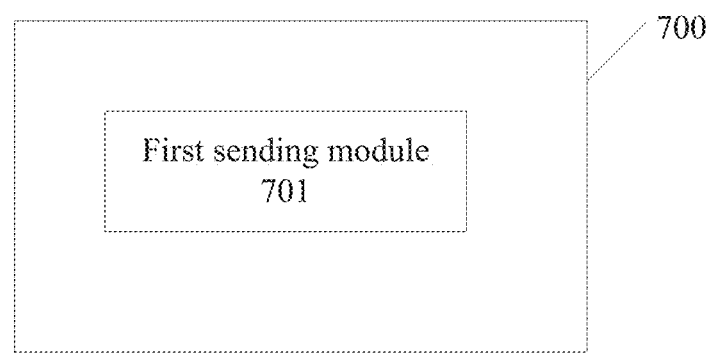
FIG. 7 is a second schematic diagram of a working mode indicating apparatus in an embodiment of the present application.

Referring to FIG. 7, an embodiment of the present application provides a working mode indicating apparatus, and the apparatus 700 includes:
- a first sending module 701, configured to send first information, where the first information indicates an RIS working mode or a relay working mode.

In this embodiment of the present application, the RIS working mode or the relay working mode is associated with at least one of the following: beam pointing of a reflected signal or a refracted signal of an RIS or a relay; a beamforming mode of a reflected signal or a refracted signal of an RIS or a relay; a polarization manner of a reflected signal or a refracted signal of an RIS or a relay; and an OAM manner of a reflected signal or a refracted signal of an RIS or a relay.

In this embodiment of the present application, the RIS working mode or the relay working mode is quasi-co-located with at least one of the following: an SSB sent by the network side device, a CSI-RS sent by the network side device, a TRS sent by the network side device, a DMRS sent by the network side device, and a PRS sent by the network side device.

In this embodiment of the present application, the first information further indicates an uplink configuration or a downlink configuration corresponding to the RIS working mode or the relay working mode.

In this embodiment of the present application, the first information is cell-specific signaling or terminal-specific signaling.

In this embodiment of the present application, types of the RIS working mode or the relay working mode include: a definite working mode and a flexible working mode.

In the embodiment of the present application, the apparatus further includes:

a second sending module, configured to: if the first information indicates that the type of the RIS working mode or the relay working mode is an uncertain working mode, send second information, where the second information indicates that the RIS working mode or the relay working mode is a first working mode among definite working modes.

In this embodiment of the present application, the second information is layer 1 signaling.

In this embodiment of the present application, the RIS working mode or the relay working mode is the RIS working mode or the relay working mode in at least a part of time units in one cycle or multiple cycles.

The apparatus according to embodiments of the present disclosure can implement the processes in the method embodiments in FIG. 4, and achieve the same technical effect. To avoid repetition, details are not described herein again.

Figure 8:
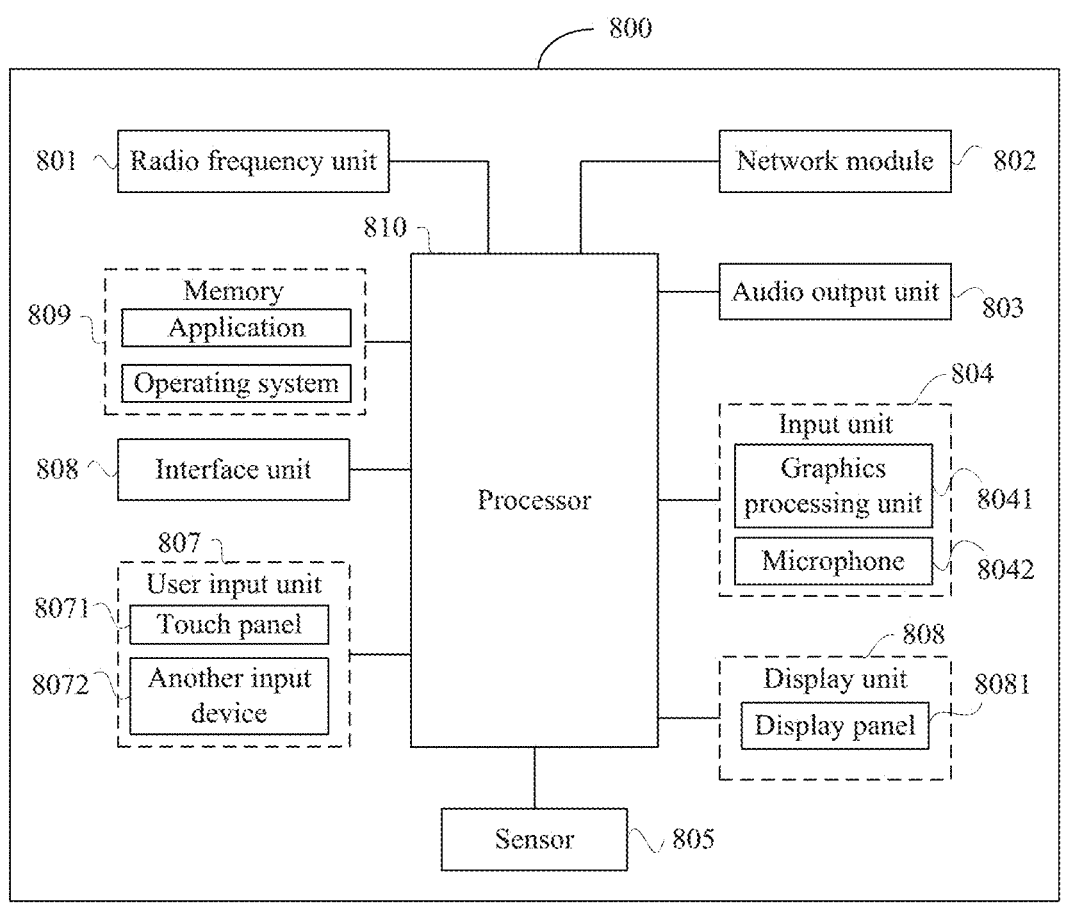
FIG. 8 is a schematic diagram of a first device in an embodiment of the present application.

FIG. 8 is a schematic diagram of a hardware structure of a first device implementing an embodiment of the present application. The first device is a terminal, or the first device is a reconfigurable intelligent surface RIS or a relay.

The first device 800 includes, but is not limited to: a radio frequency unit 801, a network module 802, an audio output unit 803, an input unit 804, a sensor 805, a display unit 806, a user input unit 807, an interface unit 808, a memory 809, and a processor 810 and other components.

Those skilled in the art can understand that the first device 800 may further include the power supply (for example, a battery) supplying power to each component. In some implementations, the power supply may be logically connected to the processor 810 by using a power management system, so as to implement functions such as charging management, discharging management and power consumption management by using the power management system. The first device structure shown in FIG. 8 does not constitute any limitation on the first device, and the first device may include more or fewer components than those shown in the figure, or combine some components, or have different component arrangements.

It should be understood that, in this embodiment of the present application, the input unit 804 may include a Graphics Processing Unit (GPU) 8041 and a microphone 8042, and the graphics processing unit 8041 processes image data of a still picture or a video obtained by an image capture apparatus (such as a camera) in a video capture mode or an image capture mode. The display unit 806 may include a display panel 8061, and the display panel 8061 may be configured in a form of a liquid crystal display, an organic light-emitting diode, or the like. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein.

In this embodiment of the present application, the radio frequency unit 801 receives downlink data from a network side device and then sends the downlink data to the processor 810 for processing; and sends uplink data to the network side device. Usually, the radio frequency unit 801 includes but is not limited to an antenna, at least one amplifier, a transceiver, a coupler, a low noise amplifier, a duplexer, and the like.

The memory 809 may be configured to store a software program or an instruction and various pieces of data. The memory 809 may mainly include a program or instruction storage area and a data storage area. The program or instruction storage area may store an operating system, and an application or an instruction required by at least one function (for example, a sound playing function or an image playing function). In addition, the memory 809 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 810 may include one or more processing units. In some implementations, an application processor and a modem processor may be integrated into the processor 810. The application processor mainly processes an operating system, a user interface, an application, an instruction, or the like. The modem processor mainly processes wireless communication, for example, a baseband processor. It can be understood that, in some implementations, the modem processor may not be integrated into the processor 810.

The first device according to embodiments of the present application can implement the processes in the method embodiments in FIG. 3, and achieve the same technical effect. To avoid duplication, details are not described herein again.

Figure 9:
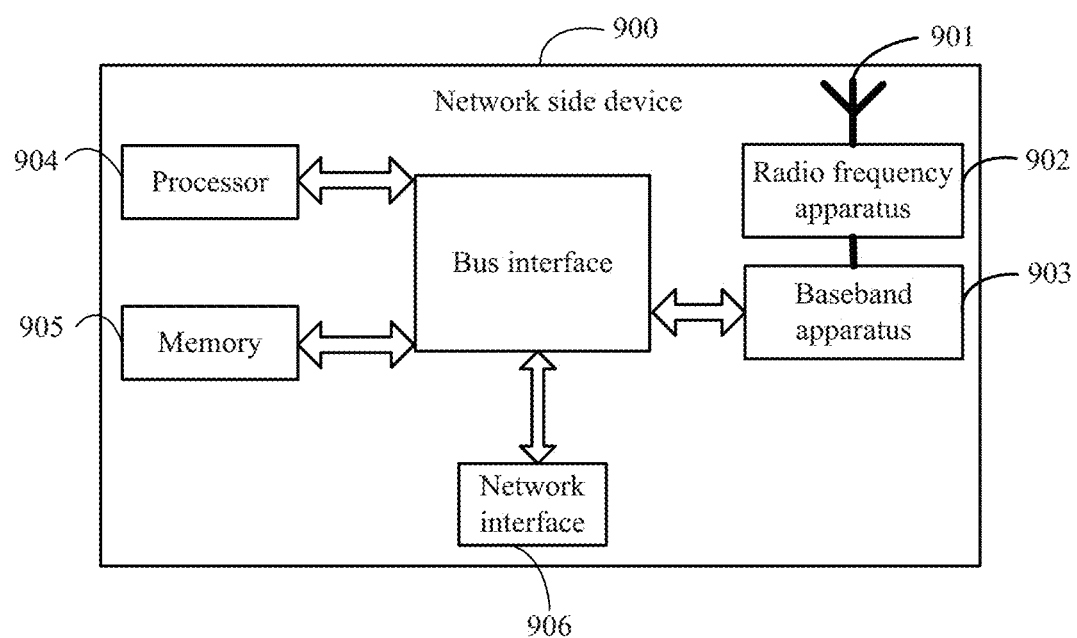
FIG. 9 is a schematic diagram of a network side device in an embodiment of the present application.

An embodiment of the present application further provides a network side device. As shown in FIG. 9, the network side device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and transmits the received information to the baseband apparatus 903 for processing. In a downlink direction, the baseband apparatus 903 processes information to be sent and transmits the information to the radio frequency apparatus 902, and the radio frequency apparatus 902 processes the received information and then transmits the information through the antenna 901.

The foregoing band processing apparatus may be located in the baseband apparatus 903, and the method performed by the network side device in the foregoing embodiment may be implemented in the baseband apparatus 903. The baseband apparatus 903 includes a processor 904 and a memory 905.

The baseband apparatus 903 may include, for example, at least one baseband board, where a plurality of chips are disposed on the baseband board. As shown in FIG. 9, one chip is, for example, the processor 904, which is connected to the memory 905, so as to invoke a program in the memory 905 to perform operations of the network device shown in the foregoing method embodiment.

The baseband apparatus 903 may further include a network interface 906, configured to exchange information with the radio frequency apparatus 902, where the interface is, for example, a Common Public Radio Interface (CPRI).

In some implementations, the network side device in this embodiment of the present application further includes an instruction or a program that is stored in the memory 905 and that can be run on the processor 904. The processor 904 invokes the instruction or the program in the memory 905 to perform the method performed by the modules shown in FIG. 7, and a same technical effect is achieved. To avoid repetition, details are not described herein again.

An embodiment of the present application further provides a computer program product, the computer program product is stored in a non-volatile storage medium, and when the computer program product is executed by at least one processor, the step of the processing method according to FIG. 3 or FIG. 4 is performed.

An embodiment of the present application further provides a readable storage medium. The readable storage medium stores a program or an instruction, and when the program or the instruction is executed by a processor, the various processes of the foregoing method embodiment according to FIG. 3 or FIG. 4 is performed and the same technical effects can be achieved. To avoid repetition, details are not described herein again.

The processor is a processor in the terminal in the foregoing embodiment. The readable storage medium includes a computer-readable storage medium such as a Read-Only Memory (ROM), a Random Access Memory (RAM), a magnetic disk, an optical disc, or the like.

An embodiment of the present application further provides a chip, the chip includes a processor and a communication interface, the communication interface is coupled to the processor, and the processor is configured to run the program or instruction of the network side device to realize each process of the embodiment of the method according to FIG. 3 or FIG. 4, and can achieve the same technical effect. To avoid repetition, details are not repeated herein.

It should be understood that the chip mentioned in this embodiment of the present application may also be referred to as a system-level chip, a system chip, a chip system, or an on-chip system chip.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the implementations of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of the present application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present application.

The embodiments of the present application are described above with reference to the accompanying drawings, but the present application is not limited to the foregoing specific implementation manners. The foregoing specific implementation manners are merely schematic instead of restrictive. Under enlightenment of the present application, a person of ordinary skills in the art may make many forms without departing from aims and the protection scope of claims of the present application, all of which fall within the protection scope of the present application.

The invention claimed is:

1. A working mode indicating method, performed by a first device, wherein the first device is a terminal, or the first device is a Reconfigurable Intelligent Surface (RIS) node or a relay node, and the method comprises:
   receiving first information sent by a network side device, wherein the first information indicates an RIS working mode or a relay working mode,
   wherein the RIS working mode or the relay working mode is an RIS working mode or a relay working mode on at least a part of time units in one cycle or multiple cycles.

2. The method according to claim 1, wherein the first device is an RIS or a relay node, and the method further comprises:
   updating the working mode according to the first information, or
   wherein the first device is a terminal, and the method further comprises:
   performing corresponding transmission according to the RIS working mode or relay working mode indicated by the first information.

3. The method according to claim 2, wherein the performing corresponding transmission according to the RIS working mode or relay working mode indicated by the first information comprises one of the following:
   performing a two-step random access process or a four-step random access process according to the RIS working mode or the relay working mode indicated by the first information;
   performing uplink data or downlink data transmission according to the RIS working mode or the relay working mode indicated by the first information; or
   performing a Hybrid Automatic Repeat reQuest (HARQ) process according to the RIS working mode or the relay working mode indicated by the first information,
   wherein the performing a four-step random access process according to the RIS working mode or the relay working mode indicated by the first information comprises:
   determining an index of a target Synchronization Signal Block (SSB);
   sending message 1 at a first moment, wherein an RIS working mode or a relay working mode at the first moment is the same as an RIS working mode or a relay working mode corresponding to a moment of the target SSB, and the first moment corresponds to a random access occasion associated with an index of the target SSB; and listening to message 2 at a second moment after the terminal sends message 1, wherein an RIS working mode or a relay working mode at the second moment is the same as an RIS working mode or a relay working mode corresponding to a moment of message 1, wherein the performing a two-step random access process according to the RIS working mode or the relay working mode indicated by the first information comprises:

determining an index of a target SSB;

sending a preamble of message A at a fifth moment, wherein an RIS working mode or a relay working mode at the fifth moment is the same as an RIS working mode or a relay working mode corresponding to a moment of the target SSB, and the fifth moment corresponds to a random access occasion associated with an index of the target SSB;

sending message A at a sixth moment, wherein an RIS working mode or a relay working mode at the sixth moment is the same as an RIS working mode or a relay working mode corresponding to a moment of the target SSB; and listening to message B at a seventh moment after message A is sent, wherein an RIS working mode or a relay working mode at the seventh moment is the same as an RIS working mode or a relay working mode corresponding to a moment of message A, wherein the performing a HARQ process according to the RIS working mode or the relay working mode indicated by the first information comprises:

sending, at a ninth moment, an acknowledgment or a negative acknowledgment corresponding to a first channel, wherein an RIS working mode or a relay working mode at the ninth moment is the same as an RIS working mode or a relay working mode at a moment when the first channel is transmitted, and wherein the first channel is a physical downlink control channel or a physical downlink shared channel.

4. The method according to claim 3, wherein the performing uplink data or downlink data transmission according to the RIS working mode or the relay working mode indicated by the first information comprises:

receiving a fourth message;

determining a target SSB index; and receiving downlink data or sending uplink data at an eighth moment, wherein the eighth moment belongs to a time resource that is used for receiving downlink data or sending uplink data and that is indicated by the fourth information, and an RIS working mode or a relay working mode at the eighth moment is the same as an RIS working mode or a relay working mode at a moment of the index of the target SSB.

5. The method according to claim 1, wherein the first information is further used to indicate an uplink configuration or a downlink configuration corresponding to the RIS working mode or the relay working mode.

6. The method according to claim 1, wherein types of the RIS working mode or the relay working mode comprise: a definite working mode and a flexible working mode.

7. The method according to claim 6, further comprising: when the first information indicates that the type of the RIS working mode or the relay working mode is a flexible working mode, receiving second information, wherein the second information indicates that the RIS working mode or the relay working mode is a first working mode among definite working modes, wherein the second information is layer 1 signaling.

8. The method according to claim 1, wherein the RIS working mode or the relay working mode is associated with at least one of the following:

beam pointing of a reflected signal or a refracted signal of an RIS or a relay;

a beamforming mode of the reflected signal or the refracted signal of the RIS or the relay;

a polarization manner of the reflected signal or the refracted signal of the RIS or the relay; or an Orbital Angular Momentum (OAM) mode of the reflected signal or the refracted signal of the RIS or the relay.

9. The method according to claim 1, wherein:

when the RIS working mode or the relay working mode is the RIS working mode or the relay working mode on at least a part of time units in one cycle, a number of time units with a same RIS working mode or relay working mode in the one cycle is greater than 1; and when the RIS working mode or the relay working mode is the RIS working mode or the relay working mode on at least a part of time units in multiple cycles, a number of time units with a same RIS working mode or relay working mode in each of the multiple cycles is greater than 1.

10. The method according to claim 1, wherein the RIS working mode or the relay working mode is quasi-co-located with at least one of the following:

a Synchronization Signal Block (SSB), a Channel State Information Reference Signal (CSI-RS), a Tracking Reference Signal (TRS), a DeModulation Reference Signal (DMRS), or a Positioning Reference Signal (PRS) sent by the network side device.

11. A working mode indicating method, performed by a network side device, comprising:

sending first information, wherein the first information indicates a Reconfigurable Intelligent Surface (RIS) working mode or a relay working mode, wherein the RIS working mode or the relay working mode is an RIS working mode or a relay working mode on at least a part of time units in one cycle or multiple cycles.

12. The method according to claim 11, wherein types of the RIS working mode or the relay working mode comprise: a definite working mode and an uncertain working mode.

13. The method according to claim 11, wherein the RIS working mode or the relay working mode is associated with at least one of the following:

beam pointing of a reflected signal or a refracted signal of an RIS or a relay;

a beamforming mode of the reflected signal or the refracted signal of the RIS or the relay;

a polarization manner of the reflected signal or the refracted signal of the RIS or the relay; or an operation, maintenance, and management manner of the reflected signal or the refracted signal of the RIS or the relay.

14. The method according to claim 11, wherein the RIS working mode or the relay working mode is quasi-co-located with at least one of the following:

a Synchronization Signal Block (SSB), a Channel State Information Reference Signal (CSI-RS), a Tracking Reference Signal (TRS), a DeModulation Reference Signal (DMRS), or a Positioning Reference Signal (PRS) sent by the network side device.

15. The method according to claim 11, wherein the first information further indicates an uplink configuration or a downlink configuration corresponding to the RIS working mode or the relay working mode.

16. The method according to claim 11, wherein the first information is cell-specific signaling or terminal-specific signaling.

17. The method according to claim 11, comprising:
when the first information indicates that a type of the RIS working mode or the relay working mode is an uncertain working mode, sending second information, wherein the second information indicates that the RIS working mode or the relay working mode is a first working mode among definite working modes.

18. The method according to claim 17, wherein the second information is layer 1 signaling.

* * * * *